US011714973B2

(12) United States Patent
Mack et al.

(10) Patent No.: US 11,714,973 B2
(45) Date of Patent: Aug. 1, 2023

(54) METHODS AND SYSTEMS FOR CONTROL OF CONTENT IN AN ALTERNATE LANGUAGE OR ACCENT

(71) Applicant: Rovi Guides, Inc., San Jose, CA (US)

(72) Inventors: Carla Mack, Los Angeles, CA (US); Phillip Teich, Pasadena, CA (US); Mario Sanchez, San Jose, CA (US); John Blake, Belmont, CA (US)

(73) Assignee: Rovi Guides, Inc., San Jose, CA (US)

( * ) Notice: Subject to any disclaimer, the term of this patent is extended or adjusted under 35 U.S.C. 154(b) by 0 days.

(21) Appl. No.: 17/742,657

(22) Filed: May 12, 2022

(65) Prior Publication Data

US 2022/0414351 A1 Dec. 29, 2022

Related U.S. Application Data

(63) Continuation of application No. 16/161,883, filed on Oct. 16, 2018, now Pat. No. 11,361,168.

(51) Int. Cl.
*G06F 40/58* (2020.01)
*G06F 16/683* (2019.01)
*G10L 15/22* (2006.01)

(52) U.S. Cl.
CPC .......... *G06F 40/58* (2020.01); *G06F 16/685* (2019.01); *G10L 15/22* (2013.01); *G10L 2015/221* (2013.01); *G10L 2015/225* (2013.01)

(58) Field of Classification Search
CPC . G06F 16/685; G10L 15/22; G10L 2015/221; G10L 2015/225
See application file for complete search history.

(56) References Cited

U.S. PATENT DOCUMENTS

| | | | |
|---|---|---|---|
| 6,266,674 B1 | 7/2001 | Hejna | |
| 9,367,541 B1 | 6/2016 | Servan et al. | |
| 9,461,958 B1 | 10/2016 | Green et al. | |
| 9,548,046 B1 | 1/2017 | Boggiano et al. | |
| 9,854,324 B1 | 12/2017 | Panchaksharaiah et al. | |
| 11,361,168 B2 | 6/2022 | Mack et al. | |
| 2002/0120436 A1 | 8/2002 | Mizutani et al. | |
| 2003/0191643 A1 | 10/2003 | Belenger et al. | |

(Continued)

FOREIGN PATENT DOCUMENTS

EP 2963641 A1 1/2016

OTHER PUBLICATIONS

International Search Report and Written Opinion in Application No. PCT/US2019/055911, dated Jan. 29, 2020.

*Primary Examiner* — Anne L Thomas-Homescu
(74) *Attorney, Agent, or Firm* — Haley Guiliano LLP (57) ABSTRACT

Systems and methods are described herein for replaying content dialogue in an alternate language in response to a user command. While the content is playing on a media device, a first language in which the content dialogue is spoken is identified. Upon receiving a voice command to repeat a portion of the dialogue, the language in which the command was spoken is identified. The portion of the content dialogue to repeat is identified and translated from the first language to the second language. The translated portion of the content dialogue is then output. In this way, the user can simply ask in their native language for the dialogue to be repeated and the repeated portion of the dialogue is presented in the user's native language.

20 Claims, 11 Drawing Sheets

(56) References Cited

U.S. PATENT DOCUMENTS

| | | |
|---|---|---|
| 2003/0216922 A1 | 11/2003 | Gonzales et al. |
| 2005/0273339 A1 | 12/2005 | Chaudhari et al. |
| 2008/0077388 A1 | 3/2008 | Nash et al. |
| 2009/0052636 A1 | 2/2009 | Webb et al. |
| 2009/0271176 A1 | 10/2009 | Bodin et al. |
| 2010/0138213 A1 | 6/2010 | Bicici et al. |
| 2010/0185434 A1 | 7/2010 | Burvall et al. |
| 2011/0020774 A1 | 1/2011 | Nguyen |
| 2011/0246172 A1 | 10/2011 | Liberman et al. |
| 2012/0035907 A1* | 2/2012 | Lebeau .............. G10L 13/00 704/235 |
| 2013/0262076 A1 | 10/2013 | Kamatani et al. |
| 2014/0201631 A1 | 7/2014 | Pornprasitsakul et al. |
| 2014/0294161 A1 | 10/2014 | O'Conor et al. |
| 2014/0297256 A1 | 10/2014 | Rogowski et al. |
| 2015/0006147 A1 | 1/2015 | Schmidt |
| 2015/0255066 A1 | 9/2015 | Wilder et al. |
| 2015/0261429 A1 | 9/2015 | Ghassabian |
| 2015/0269135 A1 | 9/2015 | Kim et al. |
| 2016/0162478 A1 | 6/2016 | Blassin et al. |
| 2016/0247542 A1 | 8/2016 | Tanaka |
| 2016/0314116 A1 | 10/2016 | Kamatani et al. |
| 2017/0116184 A1 | 4/2017 | Bradley et al. |
| 2017/0132019 A1* | 5/2017 | Karashchuk .......... G06F 3/0482 |
| 2018/0032610 A1 | 2/2018 | Cameron et al. |
| 2018/0067928 A1 | 3/2018 | Miura et al. |
| 2018/0143975 A1 | 5/2018 | Casal et al. |
| 2018/0174595 A1 | 6/2018 | Dirac et al. |
| 2018/0322117 A1 | 11/2018 | Cohen |
| 2018/0330732 A1 | 11/2018 | Dasgupta |
| 2019/0115010 A1 | 4/2019 | Yu et al. |
| 2019/0129944 A1 | 5/2019 | Kawano et al. |
| 2019/0313054 A1 | 10/2019 | Harrison et al. |
| 2020/0051582 A1 | 2/2020 | Gilson |
| 2020/0117714 A1 | 4/2020 | Mack et al. |
| 2020/0125643 A1 | 4/2020 | Gutierrez |

* cited by examiner

METHODS AND SYSTEMS FOR CONTROL OF CONTENT IN AN ALTERNATE LANGUAGE OR ACCENT

CROSS-REFERENCE TO RELATED APPLICATION

This application is a continuation of U.S. patent application Ser. No. 16/161,883, filed Oct. 16, 2018, the disclosure of which is hereby incorporated by reference herein in its entirety.

BACKGROUND

The present disclosure relates to content delivery and consumption systems and, more particularly, providing alternate language support for media content.

SUMMARY

In the modern world of global data traffic, media content produced in one country is often made available in other countries. People of each country often have their own language and may not be able to understand, or may have difficulty understanding, the language in which the media content was produced. Many content producers include some alternate language data, but often only one or two languages are included, and a user may desire to view and/or hear at least some portions of the media content in a language that is not included.

Systems and methods are described herein for replaying content dialogue in an alternate language in response to a user command. While the content is playing on a media device, a first language in which the content dialogue is spoken is identified. Upon receiving a command to repeat a portion of the dialogue, the language in which the command was spoken is identified. The portion of the content dialogue to repeat is identified and translated from the first language to the second language. The translated portion of the content dialogue is then output. In this way, the user can simply ask in their native language for the dialogue to be repeated and the repeated portion of the dialogue is presented in the user's native language.

To translate the identified portion of the dialogue, the media device accesses subtitle text associated with the portion of the content dialogue. The media device translates the subtitle text to the second language and outputs for display the translated subtitles. Alternatively or additionally, the media device accesses audio data associated with the portion of the dialogue. The media device transcribes the audio into text and translates the text. The media device then uses a speech synthesizer to output audio of the translated dialogue.

The media device may determine the portion of the dialogue to repeat in several ways. In one example, the media device identifies a time at which the command was received and a duration of the command. The media device then calculates the start time of the command and identifies a portion of the dialogue in progress at the time start time of the command.

In a second example, the media device identifies a plurality of portions of the content dialogue within a predefined amount of time prior to the time at which the command was received. The media device determines an accent with which each portion of dialogue was spoken, compares all of the determined accents and determines, based on the comparison, whether any portion is spoken with an accent relative to the other portions. If a portion of the dialogue is spoken with an accent relative to the other portions, the media device selects that portion of the dialogue for translation.

The media device may, in a third example, determine the portion of the dialogue to repeat by determining a word count and duration of each portion of dialogue within the predefined time prior to the time the command was received. The media device then selects the portion of the dialogue having both the highest word count and the shortest duration for translation.

The media device detects the first language by transcribing a portion of the dialogue and comparing at least a first word of the transcribed text with a database of languages. If more than one language is identified as using the first word, additional words are compared until only one language is identified.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
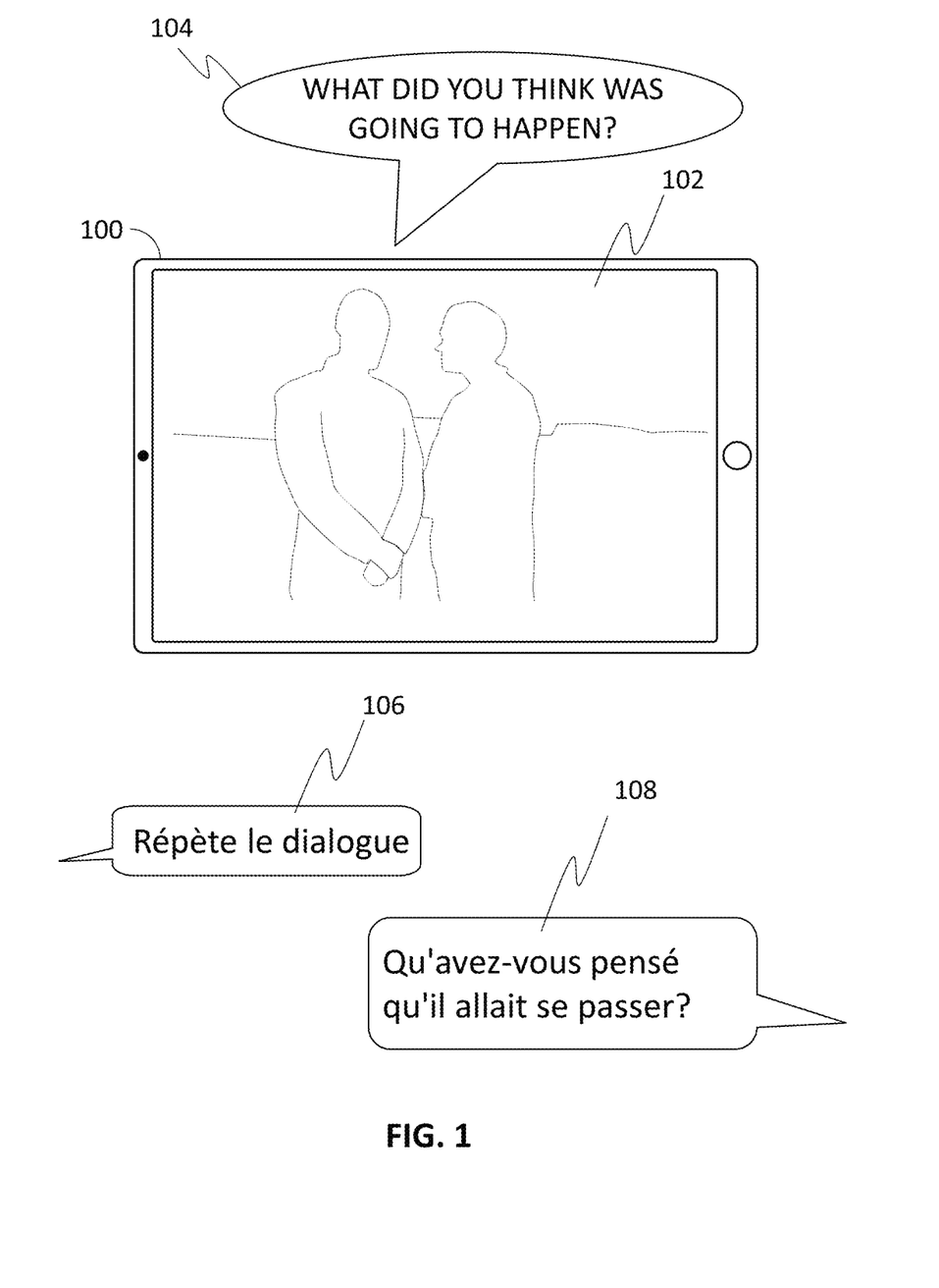
FIG. 1 shows a generalized embodiment of a command to repeat dialogue in an alternate language in accordance with some embodiments of the disclosure.

FIG. 1 depicts a user entering a command to repeat dialogue in an alternate language. Content 102 contains dialogue in a first language. While content 102 is being consumed on a media device 100, media device 100 identifies the first language. A user may request that a portion of dialogue (e.g., portion 104) be repeated using, for example, a voice command 106. Upon receiving the voice command 106, media device 100 identifies the language in which the voice command 106 was spoken. The media device 100 identifies the portion of the content dialogue 104 to repeat and translates the identified portion 104 from the first language to the second language. The media device 100 then outputs the translated portion of the content dialogue 108. Audio of the translated portion of the content dialogue 108 may be output using speakers integral to media device 100, external speakers physically connected to media device 100, or an audio output device to which media device 100 is connected via a wireless connection (e.g., Bluetooth speakers or an IoT device).

Figure 2:
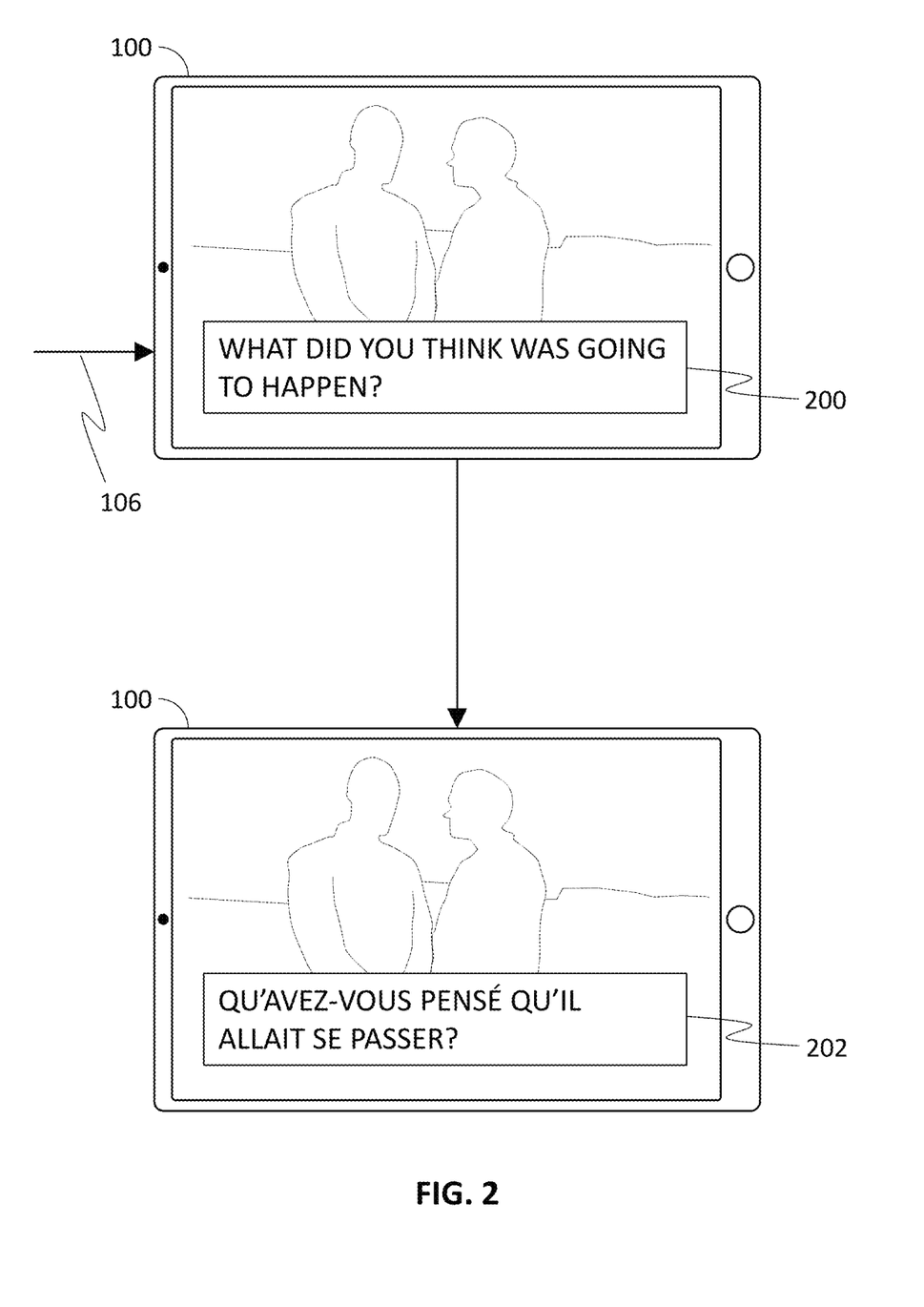
FIG. 2 shows a generalized embodiment of dialogue presented in an alternate language in accordance with some embodiments of the disclosure.
Figure 3:
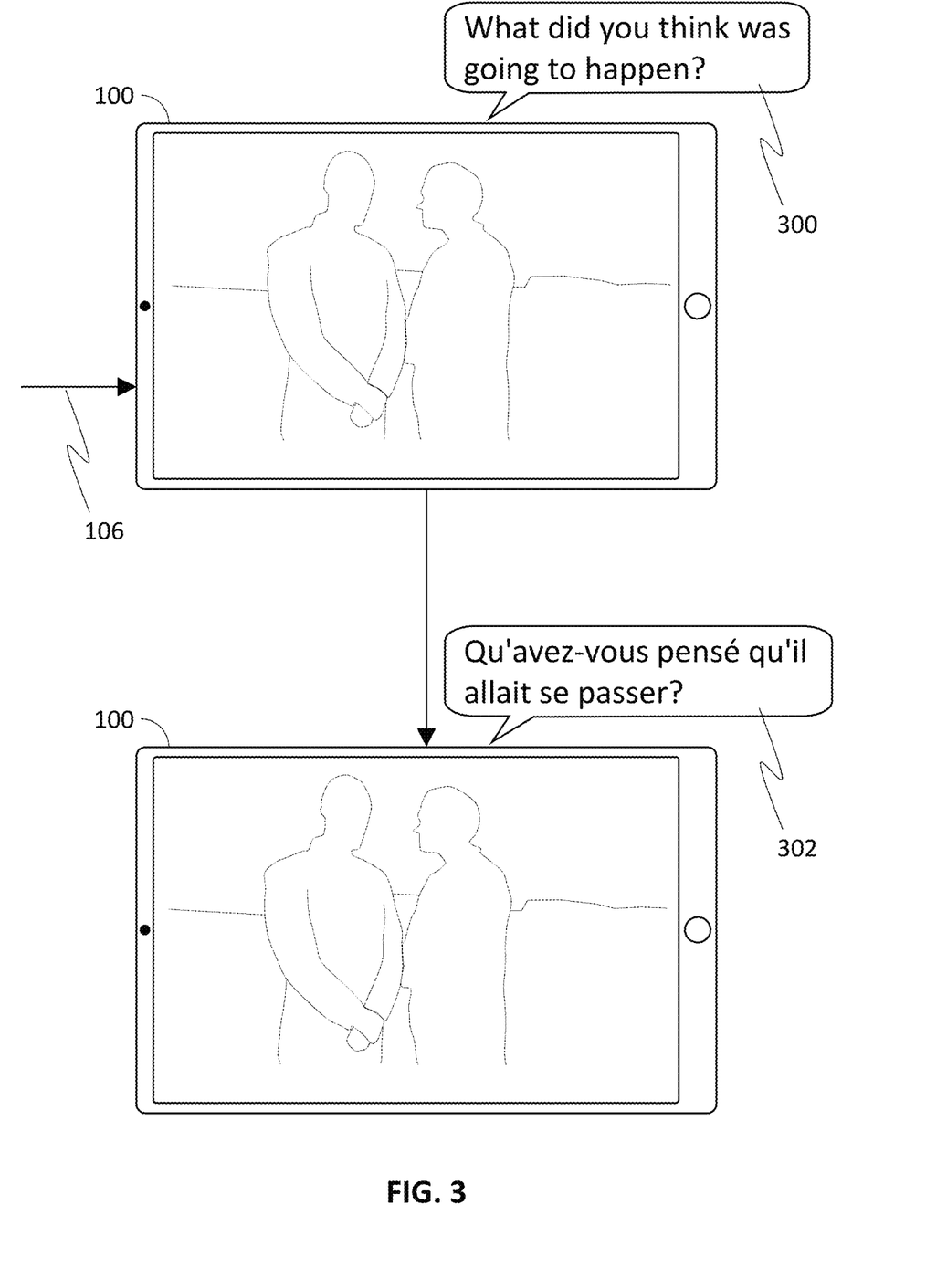
FIG. 3 shows another generalized embodiment of dialogue presented in an alternate language in accordance with some embodiments of the disclosure.

FIGS. 2 and 3 depict embodiments of presentations of the dialogue in an alternate language. In response to the voice command 106, the media device 100 may translate dialogue 200, which may be displayed as subtitles overlaying the content, and display in its place translated dialogue subtitle 202 (FIG. 2). Alternatively or additionally, the media device 100 may, access audio 300 corresponding to the dialogue and generate translated audio 302 for output (FIG. 3).

Figure 4:
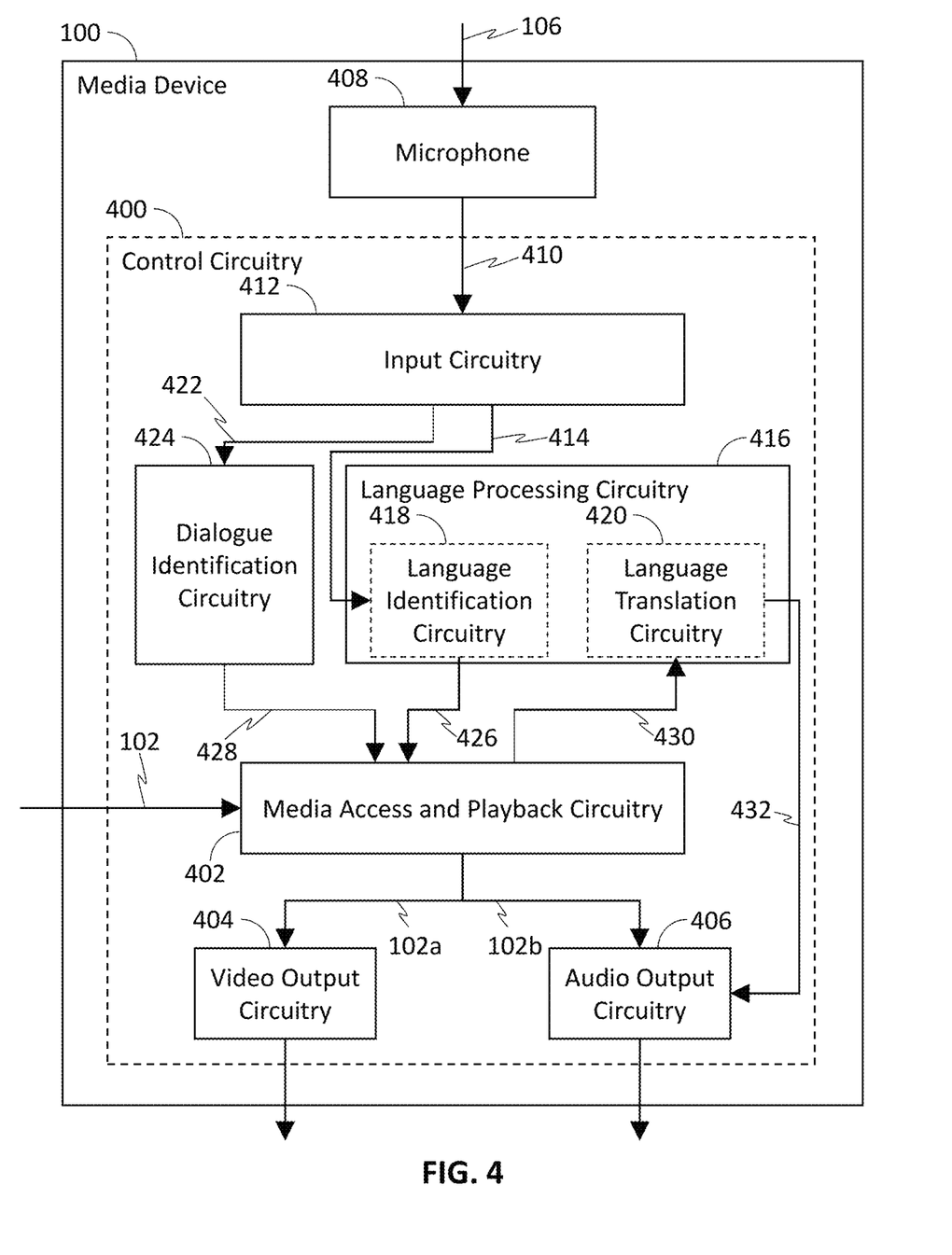
FIG. 4 is a block diagram representing control circuitry and data flow within a media device in response to a command to repeat dialogue in accordance with some embodiments of the disclosure.

FIG. 4 is an illustrative block diagram representing circuitry and data flow within media device 100 in accordance with some embodiments of the disclosure. Media device 100 may be any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. Media device 100 comprises a microphone 408. Microphone 408 may be a discrete component or may be integrated with other capture devices such as a camera. Media device 100 receives voice command 106 to repeat a portion of the dialogue using microphone 408. Media device 100 also comprises control circuitry 400. Control circuitry 400 may be based on any suitable processing circuitry and comprises control circuits and memory circuits which may be disposed on a single integrated circuit or may be discrete components. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). Some control circuits may be implemented in hardware, firmware, or software. Microphone 408 may be integrated with control circuitry 400.

Control circuitry 400 comprises media access and playback circuitry 402. Media access and playback circuitry 402 receives content 102 from a content provider. The content provider may be a service (e.g., Netflix), a television network (e.g., NBC), or a media company (e.g., NBCUniversal). Content 102 may be received via a physical RF channel over a cable television connection or terrestrial broadcast, or may be received over an Internet connection from an over-the-top (OTT) service using a wired connection (e.g., Ethernet) or wireless connection (e.g., 802.11a/b/g/n (WiFi), WiMax, GSM, UTMS, CDMA, TDMA, 3G, 4G, 4G LTE, or any other suitable type of wireless data transmission). Media access and playback circuitry processes content 102 and outputs a corresponding video signal 102*a* and audio signal 102*b* using video output circuitry 404 and audio output circuitry 406, respectively.

Control circuitry 400 also comprises input circuitry 412. Input circuitry 412 receives 410 voice command 106 from microphone 408. Upon receiving voice command 106, input circuitry transfers 414 the audio data to language processing circuitry 416, which comprises language identification circuitry 418 and language translation circuitry 420. The audio data is processed using language identification circuitry 418 to determine the language in which the voice command 106 was spoken. For example, language identification circuitry 418 transcribes the audio into text and compares at least one word of the transcribed text to a language database, which may be stored locally in a memory of media device 100, or at a remote server. The language database may return an identifier of a language or languages in which the word appears. Language circuitry 418 may continue comparing words to the database until only a single language identifier is returned.

The input circuitry 412 also sends a command 422 to dialogue identification circuitry 424 to identify a portion of the content dialogue to translate. Dialogue identification circuitry 424 accesses audio data corresponding to the content 106 and identifies discrete portions of dialogue. For example, dialogue identification circuitry 106 may user frequency analysis to determine when each character in content 106 is speaking. Alternatively or additionally, dialogue identification circuitry 424 may access subtitle data of content 106 and identify discrete portions of the subtitle data corresponding to discrete portions of dialogue. Dialogue identification circuitry determines, based on a time the voice command 106 was received, a particular portion of the content dialogue to be translated.

Media access and playback circuitry 402 receives 426, from language identification circuitry 418, the identified language in which the voice command 106 was spoken. Media access and playback circuitry 402 also receives 428, from dialogue identification circuitry 424, an indication of the portion of dialogue to be translated. Media access and playback circuitry 402 may use the identified language to determine if a translation of the dialogue in the identified language is already included in the content 102. For example, content 102 may comprise a secondary audio stream with dialogue in the identified language. Media access and playback circuitry 402 extracts the identified portion of dialogue and any preexisting translation and transfers them 430 to language translation circuitry 420. Language translation circuitry 420 translates the extracted portion of the dialogue into the identified language. For example, language translation circuitry 420 transcribes the dialogue into text and processes the text through a translation algorithm to generate translated text corresponding to the dialogue. Language translation circuitry 420 generates audio corresponding to the translated text using a speech synthesizer, and transfers 432 the audio to audio output circuitry 406 for output. Audio output circuitry 406 may be connected to speakers that are integral to media device 100, a physical audio connector (e.g., a headphone jack) for use with external speakers, or a wireless audio connection (e.g., Bluetooth or WiFi) for use with an IoT audio device. In cases where a preexisting translation is available, language translation circuitry passes the translated audio directly to audio output circuitry 406 without further processing. In cases where subtitles are available in the identified language, language translation circuitry performs speech synthesis using the preexisting subtitle text.

Figure 5:
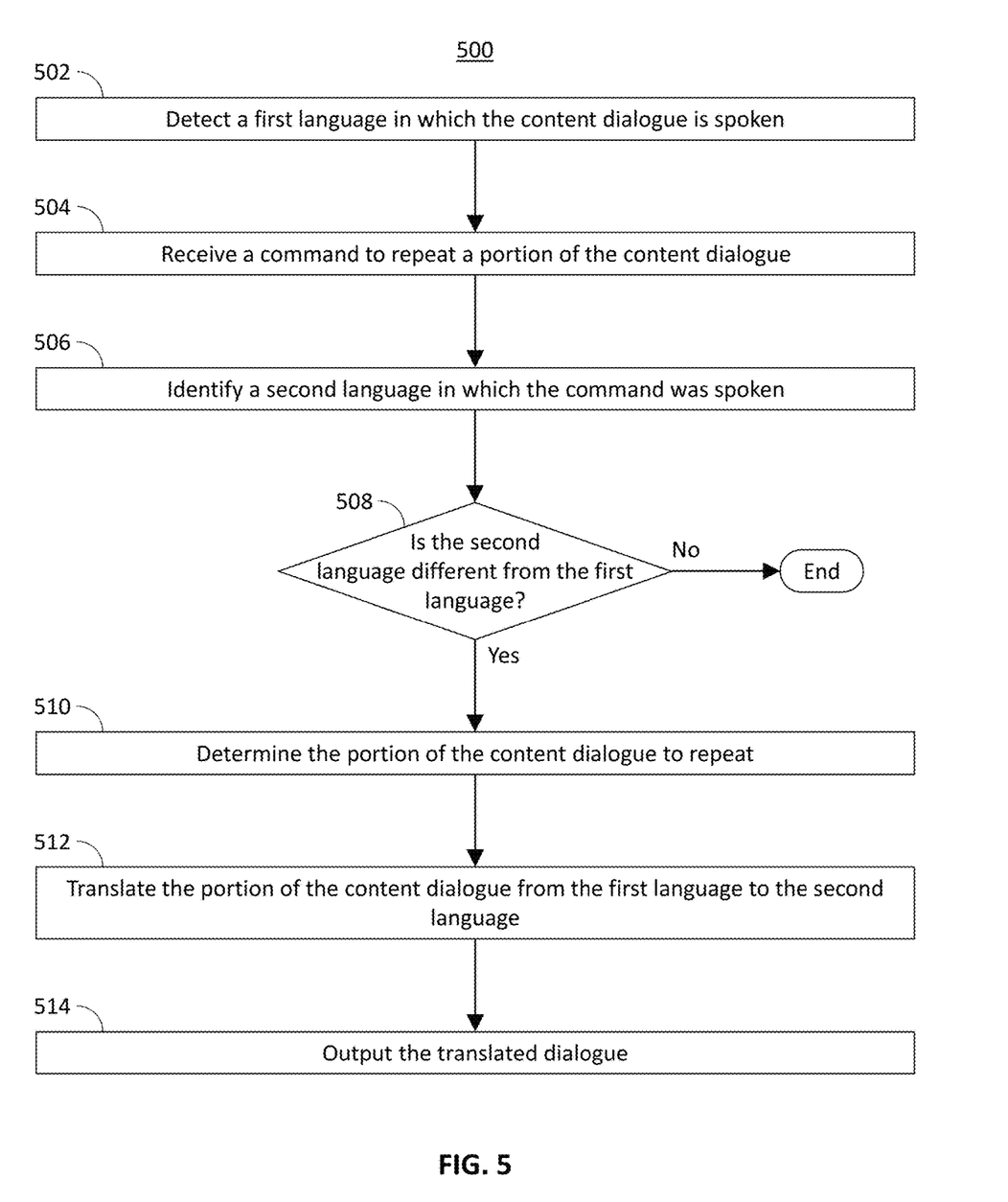
FIG. 5 is a flowchart representing a process for outputting translated dialogue in accordance with some embodiments of the disclosure.

FIG. 5 is a flowchart representing an illustrative process for outputting translated dialogue in accordance with some embodiments of the disclosure. The flowchart in FIG. 5 represents a process 500 implemented on control circuitry 400 for outputting translated dialogue according to an embodiment of the disclosure. In addition, one or more actions of process 500 may be incorporated into or combined with one or more actions of any other process or embodiment described herein.

At 502, control circuitry 400 detects a first language in which the content dialogue is spoken. For example, control circuitry 400 (e.g., using media access and playback circuitry 402) extracts a segment of audio data from the content 102. Control circuitry processes the extracted audio (e.g., using language processing circuitry 416) by transcribing the audio into corresponding text of the first language. For example, language processing circuitry 416 analyzes the audio of the content dialogue to identify various phonemes and compares the phonemes to a database of known words to determine which words were spoken in the content dialogue. Control circuitry 400 identifies the first language based on the transcribed text. This may be accomplished using methods described below in reference to FIG. 11. Alternatively, if the content 102 includes metadata indicating the language in which the content dialogue is spoken, control circuitry 400 (e.g., using media access and playback circuitry 402) retrieves the metadata indicating the language in which the content dialogue is spoken.

At 504, control circuitry 400 (e.g., using input circuitry 412) receives a command to repeat a portion of the content dialogue. The command may be an analog or digital signal received from a user input device, such as a remote control or the user's mobile device. The command may be a voice command received from the user input device or using microphone 408.

At 506, control circuitry 400 identifies a second language used by the user. If the command is a text command, control circuitry 400 identifies the language of the text. This may be accomplished using methods described below in reference to FIG. 11. If the command is received from a remote control, control circuitry 400 may access a user profile to determine the user's preferred language. If the command is a voice command, control circuitry 400 transcribes the voice command into text of the second language and identifies the second language based on the transcribed text. This may be accomplished using methods described below in reference to FIG. 11.

At 508, control circuitry 400 determines whether the second language is different from the first language. Control circuitry 400 compares the language identifier of the first language with the language identifier of the second language. If the identifier of the first language does not match the identifier of the second language, then, at step 510, control circuitry 400 determines the portion of the content dialogue to repeat. This may be accomplished using methods described below in reference to FIGS. 8-10.

At 512, control circuitry 400 translates the portion of the content dialogue from the first language to the second language. Control circuitry 400 (e.g., using media access and playback circuitry 402) retrieves the audio data corresponding to the portion of the content dialogue. Control circuitry 400 then, using language processing circuitry 416, transcribes the portion of the content dialogue into corresponding text of the first language using methods described above, and translates the transcribed text into text of the second language. Control circuitry 400 may transmit the transcribed text to a third party translation service, such as Google Translate, or may perform the translation locally using any known methods.

At 514, control circuitry 400 outputs the translated content dialogue. This may be accomplished using methods described below in reference to FIGS. 6-7.

The actions or descriptions of FIG. 5 may be used with any other embodiment of this disclosure. In addition, the actions and descriptions described in relation to FIG. 5 may be done in suitable alternative orders or in parallel to further the purposes of this disclosure.

Figure 6:
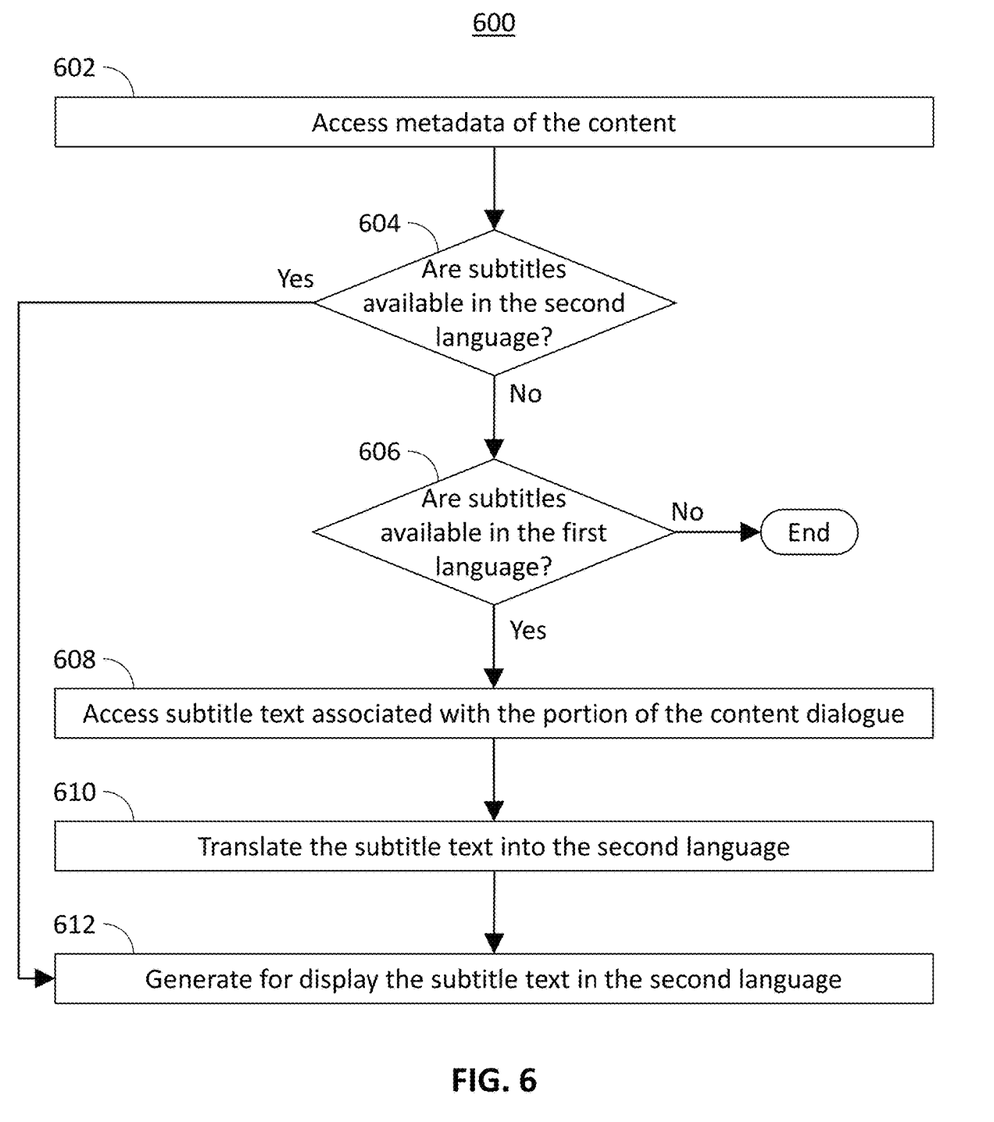
FIG. 6 is a flowchart representing a process for generating subtitles for display comprising translated dialogue in accordance with some embodiments of the disclosure.

FIG. 6 is a flowchart representing an illustrative process for generating subtitles for display comprising translated dialogue in accordance with some embodiments of the disclosure. The flowchart in FIG. 6 represents a process 600 implemented on control circuitry 400 for generating subtitles for display comprising translated dialogue according to an embodiment of the disclosure. In addition, one or more actions of process 600 may be incorporated into or combined with one or more actions of any other process or embodiment described herein.

At 602, control circuitry 400 (e.g., using media access and playback circuitry 402) accesses metadata of the content 102. For example, content 102 may be an MPEG-2 stream, which contains metadata such as program specific information (e.g., using the PSIP protocol). Content 102 may be streaming content received from a server over a network (e.g., the Internet) and may include metadata in packet headers.

At 604, control circuitry 400 (e.g., using media access and playback circuitry 402) determines whether the content 102 includes subtitles in the second language. For example, media access and playback circuitry 402 retrieves, extracts, or otherwise analyzes the metadata of the content 102 for a field, flag, or other indicator of languages in which subtitles are available. If subtitles are available in the second language, processing proceeds to step 612. If subtitles are not available in the second language, then, at 606, control circuitry 400 (e.g., using media access and playback circuitry 402) determines whether any subtitles are available, for example, in the first language. If subtitles are available, then, at 610, control circuitry 400 translates the subtitle text from the first language to the second language using methods described above in reference to FIG. 5 to generate subtitles in the second language.

At 612, control circuitry 400 (e.g., using video output circuitry 404) outputs for display the subtitles in the second language.

The actions or descriptions of FIG. 6 may be used with any other embodiment of this disclosure. In addition, the actions and descriptions described in relation to FIG. 6 may be done in suitable alternative orders or in parallel to further the purposes of this disclosure.

Figure 7:
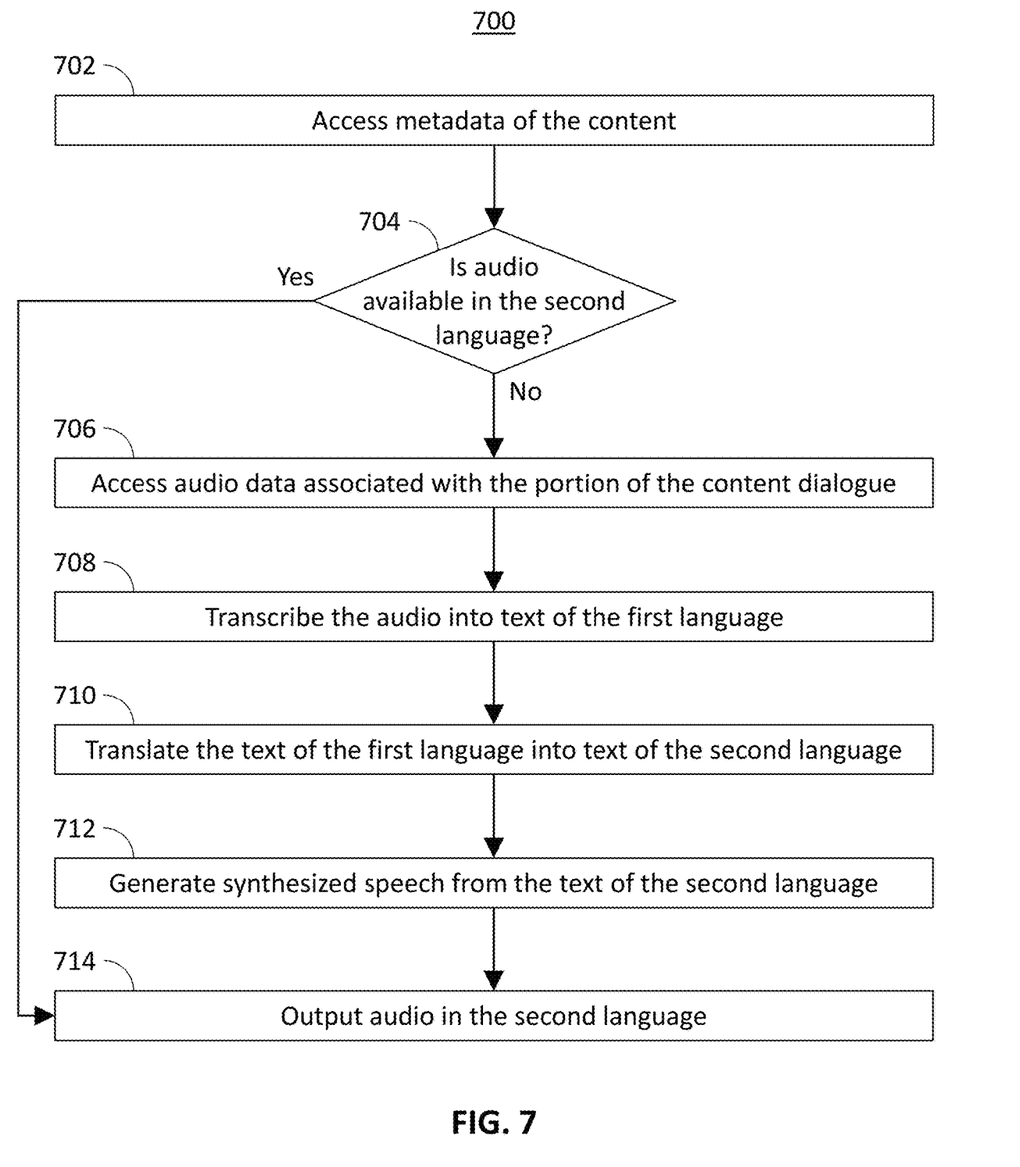
FIG. 7 is a flowchart representing a process for generating translated dialogue for audio output in accordance with some embodiments of the disclosure.

FIG. 7 is a flowchart representing an illustrative process for generating translated dialogue for audio output in accordance with some embodiments of the disclosure. The flowchart in FIG. 7 represents a process 700 implemented on control circuitry 400 for generating translated dialogue for audio output according to an embodiment of the disclosure. In addition, one or more actions of process 700 may be incorporated into or combined with one or more actions of any other process or embodiment described herein.

At 702, control circuitry 400 (e.g., using media access and playback circuitry 402) accesses metadata of the content 102. This may be accomplished using methods described above in reference to FIG. 6.

At 704, control circuitry 400 (e.g., using media access and playback circuitry 402) determines if audio data is available in the second language. For example, media access and playback circuitry 402 retrieves, extracts, or otherwise analyzes the metadata of the content 102 for a field, flag, or other indicator of languages in which audio data is available. For example, the content 102 may contain multiple audio tracks, each comprising dialogue in a different language. Such alternate audio tracks may be included using the Secondary Audio Protocol or may be separate audio streams to which pointers are embedded in the content 102. For example, content 102 may be received as part of an MPEG-2 transport stream comprising a video stream and a plurality of audio streams corresponding to the content 102. The MPEG-2 transport stream also contains metadata, such as program-specific information (e.g., using the PSIP protocol) which identifies each video and audio stream contained within the MPEG-2 transport stream. Such metadata may identify a language of each audio stream corresponding to the content 102. If audio data is available in the second language, processing proceeds to step 714. If audio data is not available in the second language, then, at 706, control circuitry 400 (e.g., using media access and playback circuitry 402) accesses audio data associated with the portion of the content dialogue. For example, media access and playback circuitry 402 extracts, retrieves, or otherwise copies the audio data of the content 102 from a playback time at which the portion of the content dialogue begins to a second playback time at which the portion of the content dialogue ends. In some cases, where multiple characters speak at the same time, control circuitry 400 uses frequency filtering or other audio processing techniques to capture only the portion of the content dialogue to be translated.

At 708, control circuitry 400 (e.g., using language processing circuitry 416) transcribes the audio data associated with the portion of the content dialogue into text of the first language. This may be accomplished using methods described above in reference to FIG. 5.

At 710, control circuitry 400 (e.g., using language processing circuitry 416) translates the text of the first language into text of the second language. This may be accomplished using methods described above in reference to FIG. 5.

At 712, control circuitry 400 (e.g., using language processing circuitry 416) generates synthesized speech from the text of the second language. This may be accomplished using concatenation synthesis, such as unit selection synthesis, diphone synthesis, or domain-specific synthesis, formant synthesis, articulatory synthesis, hidden Markov models-based (HMM) synthesis, sinewave synthesis, or any other suitable speech synthesis technique.

At 714, control circuitry 400 (e.g., using audio output circuitry 406) outputs the audio of the content dialogue in the second language.

It is contemplated that the actions or descriptions of FIG. 7 may be used with any other embodiment of this disclosure. In addition, the actions and descriptions described in relation to FIG. 7 may be done in alternative orders or in parallel to further the purposes of this disclosure.

Figure 8:
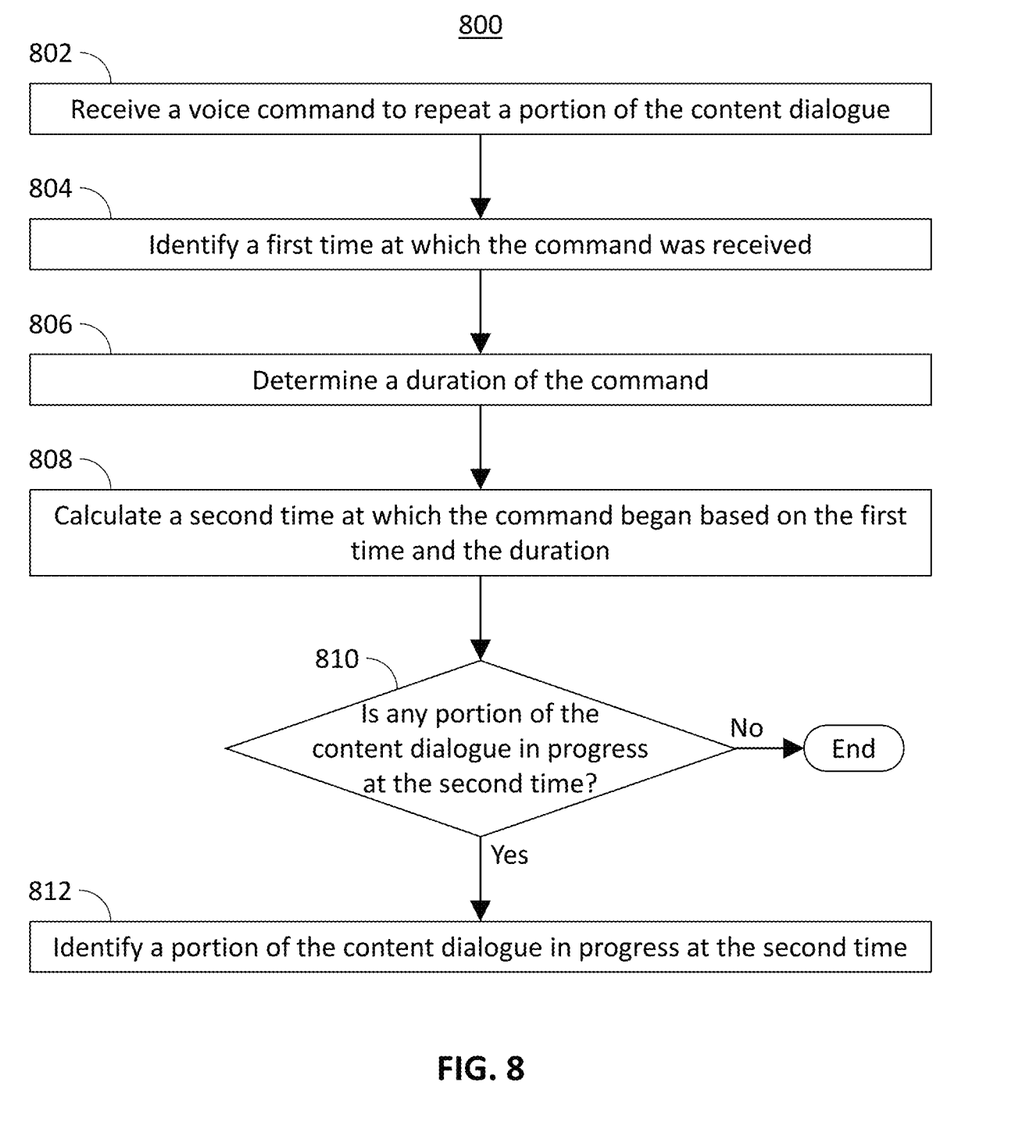
FIG. 8 is a flowchart representing a process for determining a portion of the dialogue to repeat in an alternate language in accordance with some embodiments of the disclosure.

FIG. 8 is a flowchart representing an illustrative process for determining a portion of the dialogue to repeat in an alternate language in accordance with some embodiments of the disclosure. The flowchart in FIG. 8 represents a process 800 implemented on control circuitry 400 for determining a portion of the dialogue to repeat in an alternate language according to an embodiment of the disclosure. In addition, one or more actions of process 800 may be incorporated into or combined with one or more actions of any other process or embodiment described herein.

At 802, control circuitry 400 (e.g., using input circuitry 412) receives a voice command from a user to repeat a portion of the content dialogue. For example, microphone 408 may capture a vocal utterance of the user and transfer audio data corresponding to the captured vocal utterance to input circuitry 412. Input circuitry 412 processes the captured vocal utterance and determines that the user wishes to repeat a portion of the content dialogue.

At 804, control circuitry 400 identifies a first time at which the voice command was received. In response to receiving the voice command, control circuitry 400 may access a real-time clock and store the time at which the command was received. Alternatively, when transferring the captured vocal utterance to input circuitry 412, microphone 408 may include a header or other metadata in which microphone 408 includes the time at which microphone 408 captured the vocal utterance.

At 806, control circuitry 400 determines a duration of the voice command. Control circuitry 400 processes the audio data corresponding to the vocal utterance and determine a duration of the captured vocal utterance. Alternatively, as above, microphone 408 may include in a header an indication of the duration of the vocal utterance.

At 808, control circuitry 400 calculates a second time at which the command began based on the first time and the duration. Control circuitry 400 converts the first time into an integer. For example, control circuitry 400 converts the first time into a UTC integer representing a number of seconds which have elapsed since Jan. 1, 1970. Control circuitry 400 subtracts the duration of the voice command from the integer representing the first time to calculate an integer representing the second time. Control circuitry 400 may convert the integer representing the second time to another time format, such as HH:MM:SS, and/or may convert the second time to a relative playback time of the content 102.

At 810, control circuitry 400 determines if any portion of the content dialogue is in progress at the second time. Control circuitry 400 (e.g., using media access and playback circuitry 412) may access audio data of the content 102 to determine if any character is speaking during the second time. Alternatively or additionally, media access playback circuitry 412 may access video data of the content 102 and analyze character facial movements to determine if any character is speaking at the second time. Then, at 812, control circuitry 400 identifies a portion of the content dialogue in progress at the second time.

It is contemplated that the actions or descriptions of FIG. 8 may be used with any other embodiment of this disclosure. In addition, the actions and descriptions described in relation to FIG. 8 may be done in alternative orders or in parallel to further the purposes of this disclosure.

Figure 9:
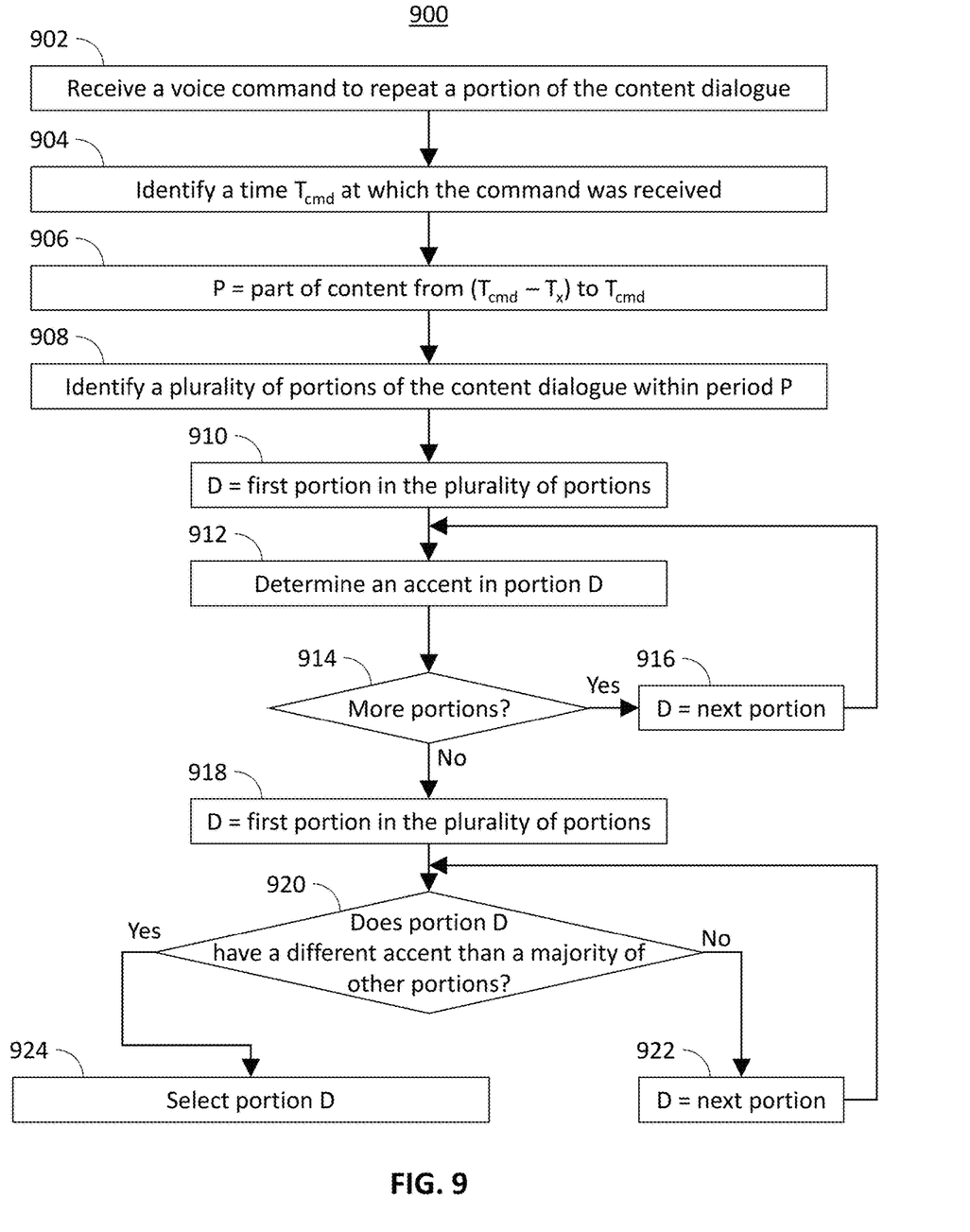
FIG. 9 is a flowchart representing another process for determining a portion of the dialogue to repeat in an alternate language in accordance with some embodiments of the disclosure.

FIG. 9 is a flowchart representing another illustrative process for determining a portion of the dialogue to repeat in an alternate language in accordance with some embodiments of the disclosure. The flowchart in FIG. 9 represents another process 900 implemented on control circuitry 400 for determining a portion of the dialogue to repeat in an alternate language according to an embodiment of the disclosure. In addition, one or more actions of process 900 may be incorporated into or combined with one or more actions of any other process or embodiment described herein.

At 902, control circuitry 400 receives a voice command to repeat a portion of the content dialogue. This may be accomplished using methods described above in reference to FIG. 8.

At 904, control circuitry 400 identifies a time $T_{cmd}$ at which the voice command was received. This may be accomplished using methods described above in reference to FIG. 8.

At 906, control circuitry 400 identifies a portion P of the content 102 from a predefined amount of time prior to $T_{cmd}$ through $T_{cmd}$ and, at 908, identifies a plurality of portions of the content dialogue that are in spoken during period P. This may be accomplished using methods described above in reference to FIG. 8.

At 910, control circuitry 400 captures a first portion of dialogue D spoken during period P. This may be accomplished using methods described above in reference to FIG. 8.

At 912, control circuitry 400 identifies an accent in which the dialogue of portion D is spoken. This may be accomplished using methods described in U.S. Pat. No. 9,854,324, which is owned by Applicant and is incorporated herein by reference.

At 914, control circuitry 400 determines whether there are any additional portions of the content dialogue in the plurality of portions of the content dialogue. If so, then, at 916, control circuitry 400 captures the next portion and processing returns to step 912, at which control circuitry 400 identifies an accent with which the portion was spoken.

If there are no additional portions, then, at 918, control circuitry 400 begins again at the first portion of the plurality of portions and, at 920, determines whether the accent with which the portion was spoken is different that the accents with which a majority of the remainder of the portions were spoken. If the accent is not different than that of the majority of the remainder of the portions, then, at 922, control circuitry moves to the next portion in the plurality of portions and processing returns to step 920.

If the accent of the portion is different than that of the majority of the remainder of the portions, then, at 924, control circuitry 400 selects the current portion D for translation.

It is contemplated that the actions or descriptions of FIG. 9 may be used with any other embodiment of this disclosure. In addition, the actions and descriptions described in relation to FIG. 9 may be done in alternative orders or in parallel to further the purposes of this disclosure.

Figure 10:
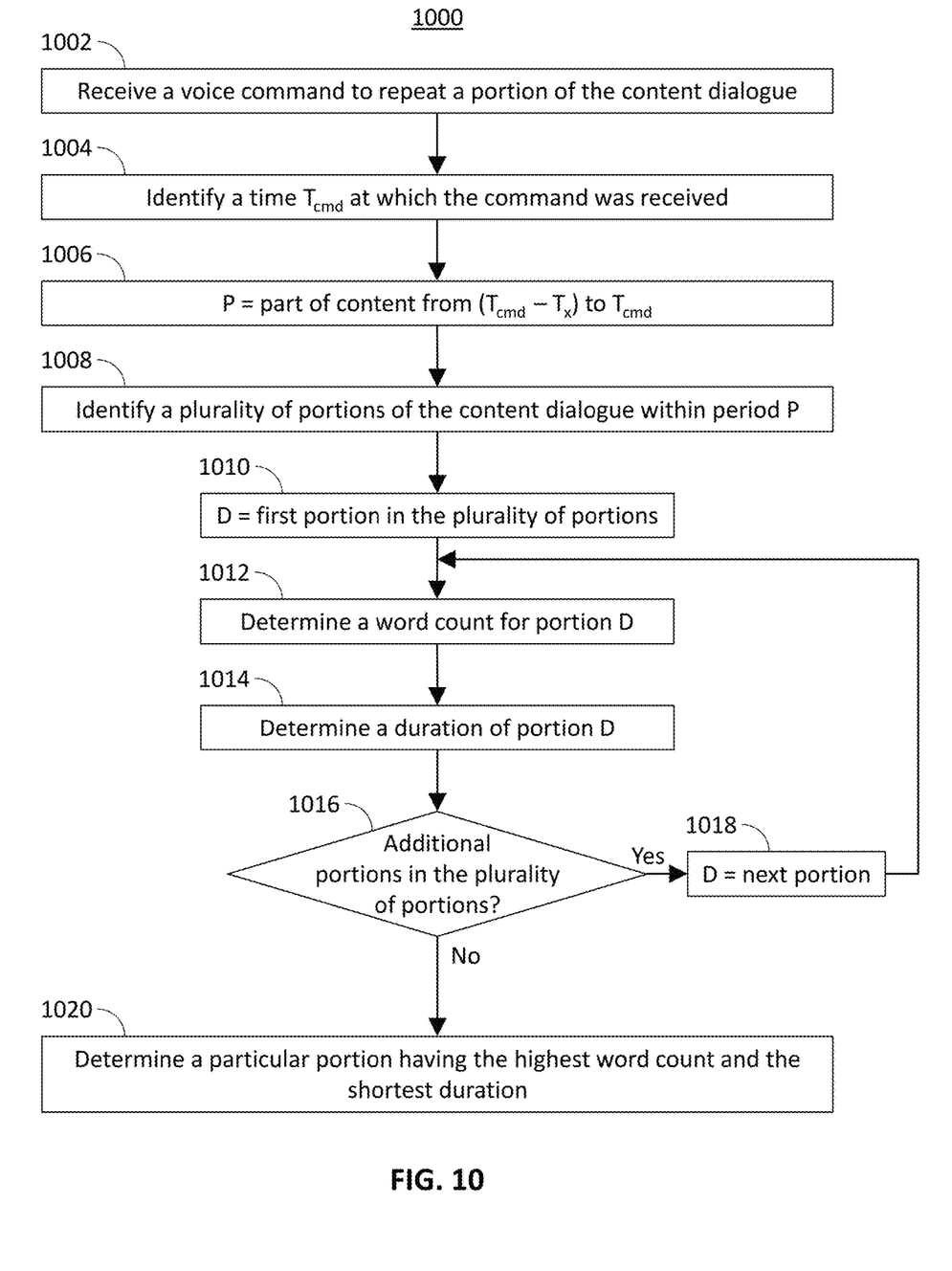
FIG. 10 is a flowchart representing a third process for determining a portion of the dialogue to repeat in an alternate language in accordance with some embodiments of the disclosure.

FIG. 10 is a flowchart representing a third illustrative process for determining a portion of the dialogue to repeat in an alternate language in accordance with some embodiments of the disclosure. The flowchart in FIG. 10 represents a third process 1000 implemented on control circuitry 400 for determining a portion of the dialogue to repeat in an alternate language according to an embodiment of the disclosure. In addition, one or more actions of process 1000 may be incorporated into or combined with one or more actions of any other process or embodiment described herein.

At 1002, control circuitry 400 (e.g., using input circuitry 412) receives a voice command to repeat a portion of the content dialogue. This may be accomplished using methods described above in reference to FIG. 8.

At 1004, control circuitry 400 identifies a time $T_{cmd}$ at which the voice command was received. This may be accomplished using methods described above in reference to FIG. 8.

At 1006, control circuitry 400 identifies a portion P of the content 102 from a predefined amount of time prior to $T_{cmd}$ through $T_{cmd}$ and, at 1008, identifies a plurality of portions of the content dialogue that are in spoken during period P. This may be accomplished using methods described above in reference to FIG. 8.

At 1010, control circuitry 400 captures a first portion of dialogue D spoken during period P. This may be accomplished using methods described above in reference to FIG. 8.

At 1012, control circuitry 400 (e.g., using language processing circuitry 416) determines a word count for portion D. Language processing circuitry 416 may transcribe portion D to obtain a word count. Alternatively, language processing circuitry 416 may perform audio analysis on the dialogue of portion D to obtain a word count. For example, language processing circuitry 416 may track the frequency of a speaking voice to identify the speaker's phrasing, intonation, and cadence. Language processing circuitry 416 then determines specific points within the audio data of portion D at which the identified phrasing, intonation, and cadence indicate that the speaker has spoken a complete word.

At 1014, control circuitry 400 determines a duration of portion D. Control circuitry 400 (e.g., using media access and playback circuitry 402) determines a playback time at which portion D begins and a playback time at which portion D ends. Control circuitry 400 may convert the beginning and end times to respective integers. Control circuitry 400 subtracts the end time from the beginning time to calculate a duration of portion D.

At 1016, control circuitry 400 determines whether additional portions of dialogue are identified during period P. If additional portions are identified, then, at 1018, control circuitry 400 captures the next portion, and processing returns to step 1012, at which control circuitry 400 determines a word count for the next portion.

If no additional portions are identified during period P, then, at 1020, control circuitry 400 determines a particular portion having the highest word count and the shortest duration. Control circuitry 400 sorts the identified portions, first by word count in descending order (i.e., highest count first), and then by duration in ascending order (i.e., shortest duration first). Control circuitry 400 then determines the portion having the highest number of words in the shortest amount of time.

It is contemplated that the actions or descriptions of FIG. 10 may be used with any other embodiment of this disclosure. In addition, the actions and descriptions described in relation to FIG. 10 may be done in alternative orders or in parallel to further the purposes of this disclosure.

Figure 11:
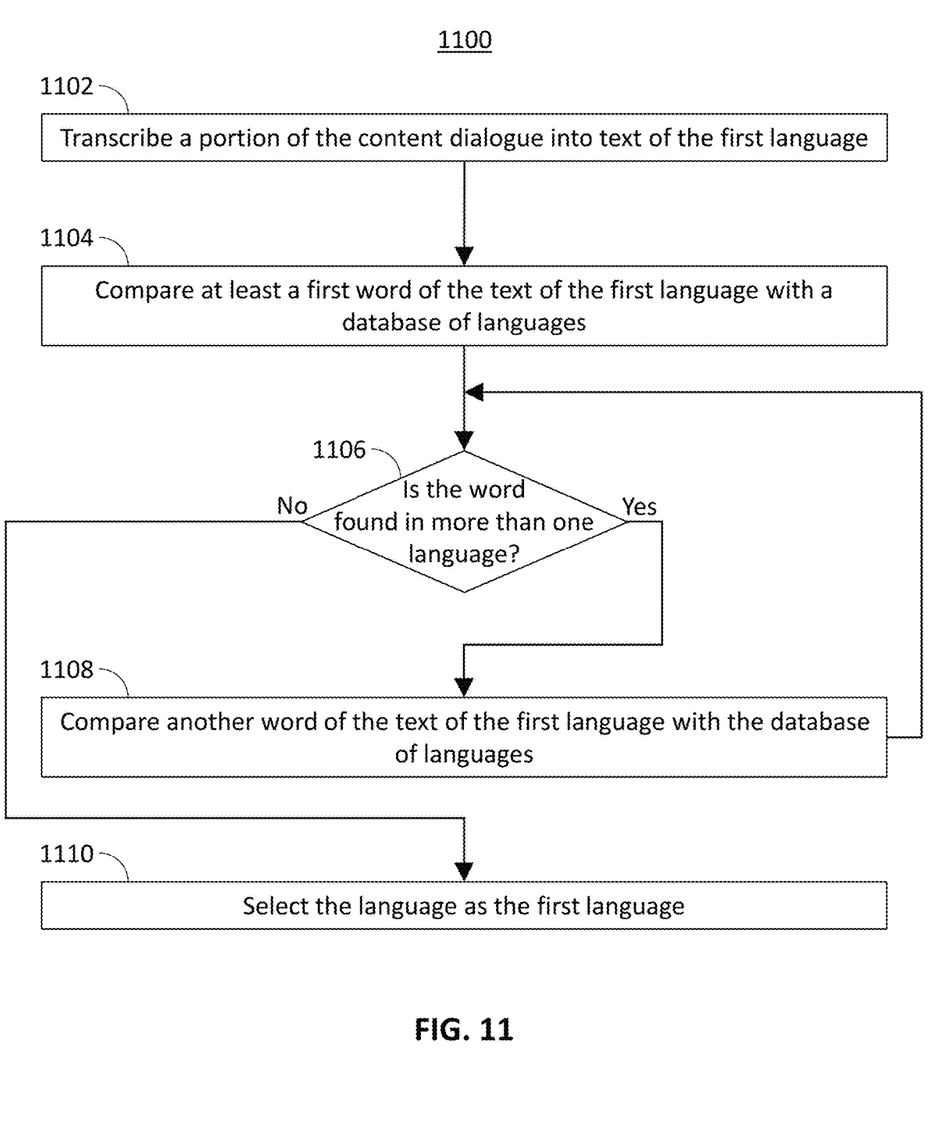
FIG. 11 is a flowchart representing a process for identifying an alternate language in accordance with some embodiments of the disclosure.

FIG. 11 is a flowchart representing an illustrative process for identifying an alternate language in accordance with some embodiments of the disclosure. The flowchart in FIG. 11 represents a process 1100 implemented on control circuitry 400 for identifying an alternate language according to an embodiment of the disclosure. In addition, one or more actions of process 1100 may be incorporated into or combined with one or more actions of any other process or embodiment described herein.

At 1102, control circuitry 400 (e.g., using language processing circuitry 416) transcribes a random portion of the content dialogue into text of the first language. This may be accomplished using methods described above in reference to FIG. 7.

At 1104, control circuitry 400 (e.g., using language processing circuitry 416) compares at least a first word of the transcribed text with a language database. The language database returns an identifier of each language in which the first word appears. At 1106, control circuitry 400 determines whether the word is found in more than one language. For example, the database returns an identifier of each language in which the word is found. If the word is found in more than one language, then, at 1108 control circuitry 400 compares a second word of the transcribed text with the language database, and processing returns to step 1106, at which control circuitry 400 determines whether the word is found in more than one language. If the word is only found in one language, then, at 1110, control circuitry 400 selects the language in which the word is found as the first language.

It is contemplated that the actions or descriptions of FIG. 11 may be used with any other embodiment of this disclosure. In addition, the actions and descriptions described in relation to FIG. 11 may be done in alternative orders or in parallel to further the purposes of this disclosure.

The processes described above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:
    playing, by a media device, media content that comprises content in a first language or a first accent;
    determining the first language or the first accent of the content played on the media device;
    receiving, from a user input device, a command regarding the content;
    determining whether the command includes a second language or a second accent;
    in response to determining the command does not include the second language or the second accent,
    processing the command in a first state consistent with the first language or the first accent, and
    in response to the processed command, outputting, by the media player, a response in the first language or the first accent; and
    in response to determining the command includes the second language or the second accent,
    processing the command in a second state consistent with the second language or the second accent, and
    in response to the processed command, outputting, by the media player, a response in the second language or the second accent.

2. The method of claim 1, wherein the command is received as audio from the user input device.

3. The method of claim 2, further comprising converting the audio to text.

4. The method of claim 1, wherein the command is received as text from the user input device.

5. The method of claim 1, further comprising determining whether the command is a command to repeat a portion of the content.

6. The method of claim 1, further comprising determining if the content is available in the second language or the second accent.

7. The method of claim 6, further comprising, in response to determining the content is not available in the second language or the second accent, translating the content from the first language or the first accent to the second language or the second accent.

8. The method of claim 6, further comprising, in response to determining the content is not available in the second language or the second accent, accessing audio data associated with the content.

9. The method of claim 8, further comprising extracting, retrieving, or copying the audio data of the content from a first playback time at which at least a portion of the content begins to a second playback time at which the portion of the content ends.

10. The method of claim 1, further comprising at least one of:
    storing, in a user profile, a first data structure indicating a list of one or more languages that the user understands; or
    determining, at a first point in time, that a language is being spoken in the content with an accent by one or more of:
        performing natural language processing to determine an audio signature of the language;
        determining, based on the audio signature, that the language is being spoken with an accent;
        identifying the language spoken in the content;
        determining that the identified language spoken in the content matches one of the languages in the list of one or more languages that the user understands;
        receiving, from a remote source, information needed to populate the explanatory messages;
        extracting from the user profile a user specific level of difficulty being indicative of a measure of difficulty the user has in understanding the language when spoken with an accent; or
        in response to determining that the language is being spoken in the content with the accent, automatically generating for display explanatory messages for the content based on the user specific level of difficulty.

11. A system comprising circuitry configured to:
    play, by a media device, media content that comprises content in a first language or a first accent;
    determine the first language or the first accent of the content played on the media device;
    receive, from a user input device, a command regarding the content;
    determine whether the command includes a second language or a second accent;
    in response to determining the command does not include the second language or the second accent,
    process the command in a first state consistent with the first language or the first accent, and in response to the processed command, output, by the media player, a response in the first language or the first accent; and in response to determining the command includes the second language or the second accent, process the command in a second state consistent with the second language or the second accent, and in response to the processed command, output, by the media player, a response in the second language or the second accent.

12. The system of claim 11, wherein the command is received as audio from the user input device.

13. The system of claim 12, further comprising circuitry configured to convert the audio to text.

14. The system of claim 11, wherein the command is received as text from the user input device.

15. The system of claim 11, further comprising circuitry configured to determine whether the command is a command to repeat a portion of the content.

16. The system of claim 11, further comprising circuitry configured to determine if the content is available in the second language or the second accent.

17. The system of claim 16, further comprising circuitry configured to, in response to determining the content is not available in the second language or the second accent, translate the content from the first language or the first accent to the second language or the second accent.

18. The system of claim 16, further comprising circuitry configured to, in response to determining the content is not available in the second language or the second accent, access audio data associated with the content.

19. The system of claim 18, further comprising circuitry configured to extract, retrieve, or copy the audio data of the content from a first playback time at which at least a portion of the content begins to a second playback time at which the portion of the content ends.

20. The system of claim 11, further comprising circuitry configured to at least one of:

store, in a user profile, a first data structure indicating a list of one or more languages that the user understands; or determine, at a first point in time, that a language is being spoken in the content with an accent by one or more of:

perform natural language processing to determine an audio signature of the language;

determine, based on the audio signature, that the language is being spoken with an accent;

identify the language spoken in the content;

determine that the identified language spoken in the content matches one of the languages in the list of one or more languages that the user understands;

receive, from a remote source, information needed to populate the explanatory messages;

extract from the user profile a user specific level of difficulty being indicative of a measure of difficulty the user has in understanding the language when spoken with an accent; or in response to determining that the language is being spoken in the content with the accent, automatically generate for display explanatory messages for the content based on the user specific level of difficulty.

* * * * *